US006873959B2

(12) United States Patent
Wood et al.

(10) Patent No.: US 6,873,959 B2
(45) Date of Patent: *Mar. 29, 2005

(54) METHOD FOR ACCELERATED PROVISION OF FUNDS FOR SOCIAL SERVICES DIRECTLY TO AN INDIVIDUAL USING A SMART CARD

(76) Inventors: Richard Glee Wood, 4627 Cashel Cir., Houston, TX (US) 77069; Wesley Jack White, Jr., 6219 Squires Ct., Spring, TX (US) 77389

( * ) Notice: Subject to any disclaimer, the term of this patent is extended or adjusted under 35 U.S.C. 154(b) by 89 days.

This patent is subject to a terminal disclaimer.

(21) Appl. No.: 10/303,191

(22) Filed: Nov. 25, 2002

(65) Prior Publication Data

US 2004/0103059 A1 May 27, 2004

(51) Int. Cl.[7] .............................................. G06F 17/60
(52) U.S. Cl. ............................................................ 705/4
(58) Field of Search .................................. 705/2, 3, 4

(56) References Cited

U.S. PATENT DOCUMENTS

| 5,070,452 | A | * | 12/1991 | Doyle et al. ................... 705/2 |
| 5,224,173 | A | * | 6/1993 | Kuhns et al. ................. 382/116 |
| 5,457,747 | A | * | 10/1995 | Drexler et al. ............... 713/186 |
| 5,536,045 | A | * | 7/1996 | Adams ........................ 283/67 |
| 5,884,271 | A | * | 3/1999 | Pitroda ........................ 705/1 |
| 6,012,035 | A | * | 1/2000 | Freeman et al. ............... 705/2 |
| 6,163,770 | A | | 12/2000 | Gamble ........................ 705/4 |
| 6,208,973 | B1 | * | 3/2001 | Boyer et al. ................... 705/2 |

FOREIGN PATENT DOCUMENTS

WO   WO 01/04821 A1 * 1/2001 ........... G06F/17/60

OTHER PUBLICATIONS

Eiland, "A Bill to be Entitled an Act." Acts of the 75th Legislature, Regular Session, 1997.
"Texas Senate Special Committee on Prompt Payment of Health Care Providers." Interim Report to the 78th Legislature, Nov. 2002.
Rehnquist, Janet. "Improper Fiscal year 2002 Medicare Fee–for–Service Payments," Jan. 8, 2003 (A17–02–02202).

* cited by examiner

Primary Examiner—Joseph Thomas
Assistant Examiner—Christopher L. Gilligan
(74) Attorney, Agent, or Firm—Buskop Law Group, P.C.; Wendy Buskop (57) ABSTRACT

The invention is a method for accelerating the provision of bands to an individual from a non-health government social service program via a program administrator using a smart card by issuing a smart card to an individual related to a particular non-health government social service program, using the smart card to determine if the user is preauthorized for the advancement of funds for a particular non-health government social service program and to determine if the service provider is preauthorized to provide service under the non-health government social service program, then transmitting acknowledgment of services from service provider to government, transmitting amount from government to service provider, transmitting acknowledgement of amount from service provider to government, and transferring payment quickly from government to service provider

10 Claims, 6 Drawing Sheets

| Individual Name (502) | Individual SSN (512) | Government Email (522) | Other Phone Numbers (532) |
| --- | --- | --- | --- |
| Individual Address (504) | Government Social Service Program Name (514) | Government Social Service Program Administrator (524) | Instructions on How to Contact Government (534) |
| Individual Phone (506) | Government Social Service Program Address (516) | Description of Social Service Benefit Plan (526) | Expiration Date of the Card (536) |
| Individual Fax (508) | Government Phone (518) | Optional Individual Payment Amount (528) | Government Website (538) |
| Individual Email (510) | Government Fax (520) | Individual's Social Service History (530) | Chip to Link to the Government for Information on the Social Service Program (540) |

METHOD FOR ACCELERATED PROVISION OF FUNDS FOR SOCIAL SERVICES DIRECTLY TO AN INDIVIDUAL USING A SMART CARD

FIELD OF THE INVENTION

The present invention relates to a method for providing funds to a social service provider using a smart card that contains identification, security measures, and other information to facilitate the transfer of funds and eliminate fraud in the social services.

BACKGROUND OF THE INVENTION

Providers of social services have traditionally had to wait long periods of time to get paid for their services. These providers have been required to extend credit to individuals with insurance in order to get paid. This situation has become tedious and causes social services costs to be very high.

A need has long existed for a system, wherein the government advances funds so that the individual does not have to handle money.

This need has been particularly great for incapacitated individuals, such as those in nursing homes, who are no longer able to handle funds or complicated transactions.

The cost of health care continues to increase as the health care industry becomes more complex, specialized, and sophisticated. The proportion of the gross domestic product that is accounted for by health care is expected to gradually increase over the coming years as the population ages and new social services become available.

Over the years, the delivery of health care services is not only from individual physicians but also from large managed health maintenance organizations, hospitals, pharmacists, and mental health therapists. There are growing numbers of social services specialists in a complex variety of health care options and programs to service the increasing populations, which has increased in elderly populations.

Unfortunately, the payment for the delivered health care is now occurring much later than the delivery of the service. Increasingly, health care providers are acting as credit institutions for the individual because of the lack of governments to timely provide funds under a policy.

The cost of supporting patient costs has increased during recent years, thereby contributing to today's costly health care system. A significant portion of the increase in the cost of social service is caused by the administrative costs represented by the systems for creating, reviewing and adjudicating health care provider payment requests. Such payment requests typically include bills for procedures performed and supplies given to patients. Currently, the systems for reviewing and adjudicating payment requests represent additional health care transaction costs that directly reduce the efficiency of the health care system and increases the cost of the health care delivered.

A need exists to reduce the magnitude of transaction costs involved in reviewing and adjudicating payment requests that would have the effect of reducing the rate of increase of health care costs.

A need exists for streamlining payment request review and adjudication that would also positively increase the portion of the health care dollar that is spent on treatment rather than administration.

A need exists to reduce the traditionally high cost of health care administration, including the review and adjudication of payment requests which results from health care service providers having to act as "banks" or "credit sources" for patients.

A need exists to facilitate the understanding of the contractual obligations between the service provider and the individual. Often, there are many different contractual arrangements between different patients, governments, and health care providers. The amount of authorized payments may vary by the service or procedure, by the particular contractual arrangement with each health care provider, by the contractual arrangements between the government and the patient regarding the allocation of payment for treatment, and by what is considered consistent with current social service practice.

During recent years, the process of creating, reviewing, and adjudicating payment requests from health care providers has become increasingly automated. For example, there exist claims processing systems whereby technicians at health care providers' offices electronically create and submit social service claims to a central processing system. The technicians include information identifying the physician, patient, social service, government, and other data with the social service. The central processing system verifies that the physician, patient, and government are participants in the claims processing systems. If so, the central processing system converts the social service request into the appropriate format of the specified government, and the claim is then forwarded to the government. Upon adjudication and approval of the insurance claims, the government initiates a check to the provider. In effect, such systems bypass the use of the mail for delivery of insurance claims. However, there is no known system for accelerated payment of funds within only a day or two of the claims presentation.

In partially automated systems, such as that described in the foregoing example, the technician can submit a claim via electronic mail on the Internet or by other electronic means. To do so, the technician establishes communication with an Internet service provider or another wide area network. While communication is maintained, the technician sends the insurance claim to a recipient and then either discontinues communication or performs other activities while communication is established. Using such conventional systems, individual at the health care provider's office are unable to determine whether the submitted claim is in condition for payment and do not receive any indication, while communication is maintained, whether the claim will be paid.

Because of the large number of governments and insurance plans, the amount of the co-payment can vary from patient to patient and from visit to visit. Moreover, when a patient is not covered for a certain treatment, the patient may be liable for the entire amount of the health care services. It is sometimes difficult for technicians at the office of the health care provider to determine that amount of any co-payment or any other amount due from the patient, such as a deductible that must be collected while the patient remains at the office after a social service visit. Once the patient leaves the office, the expense of collecting amounts owed by patients increases and the likelihood of being paid decreases. Conventional insurance claim submission systems have not been capable of efficiently and immediately informing technicians at the offices of a health care provider of amounts owed by patients, particularly when the amount is not a fixed dollar amount. A need has been desired, particularly by patients (individual) and health care providers for a solution to this dilemma.

Other methods and apparatus exist to attempt to streamline the insurance claim payment process, such as the method disclosed in Gamble U.S. Pat. No. 6,163,770. This patent reveals using a digital electrical apparatus to generate output for insurance documentation for a first insurance policy having a first risk and claims while revealing a concurrent second insurance policy for a second risk, wherein the second risk is different from the first. The processor of this method is connected to a memory device for storing and retrieving operations including machine-readable signals in the memory device, to an input device for receiving input data and converting the input data into input electrical data, to a visual display unit for converting output electrical data into output having a visual presentation, to a printer for converting the output electrical data into printed documentation, wherein the processor is programmed to control the apparatus to receive the input data and to produce the output data by steps including: inputting actuarial assumptions defining the first insurance policy; and computing a value of a specific financial attribute of the first insurance policy; the method further including the step of inserting the value of the financial attribute in the first insurance policy and other printed documentation related to the first insurance policy.

In view of the foregoing, there is a need for a more fully automated claims processing system that have the ability to have an accelerated pay schedule and an ability to reduce the uncertainty as to whether a claim to be submitted is likely to be paid or rejected.

The present invention has been developed to provide an accelerated claims processing system that would easily allow health care providers to know what patient and treatment information must accompany insurance claims, whether or not a patient is eligible for accelerated fee payment, and to obtain funds quickly against rendered services from insurance companies.

SUMMARY OF THE INVENTION

The invention relates to a method for accelerating the provision of funds to an individual from a non-health government social service program via a program administrator using a smart card, comprising the steps of: obtaining social service for a individual; creating a smart card for the individual, wherein the smart card comprises: information about social service for the individual and a individually identification code.

Next, the smart card is used to determine if the individual is eligible for accelerated provision of funds from the government to a service provider for social services based on coverage.

The smart card is used to determine if a social service is preauthorized by the government for the individual.

The smart card is used to determine if a service provider is preauthorized by the government to perform a social service. Once these determinations are made, the smart card facilitates a first transmission from the service provider to the government. The first transmission can include information relative to social service costs, information on the social services provided; and an acknowledgement that the social service has been rendered from the service provider to the individual.

The smart card facilitates the receipt of a second transmission from the government to the service provider. The second transmission preferably comprises the amount of payment required by the individual based on the insurance coverage. In addition, the smart card facilitates a third transmission to the government from the service provider. This third transmission comprises an acknowledgement that the amount of payment required by the individual is based on the insurance coverage, such as the co-payment or the deductible amount. On approximately the same day that the third transmission is received by the government, funds are transmitted from the government to the service provider for the social service provided to the individual.

BRIEF DESCRIPTION OF THE DRAWINGS

The present invention will be explained in greater detail with reference to the appended Figures, in which.

The present invention is detailed below with reference to the listed Figures.

DETAILED DESCRIPTION OF THE PREFERRED EMBODIMENTS

Before explaining the present invention in detail, it is to be understood that the invention is not limited to the particular embodiments and that it can be practiced or carried out in various ways.

The invention relates to a method for accelerating the provision of funds to a service provider from social service using a smart card. This means, the method relates to the provision of money, such as $75 for a social service using a plastic card with a chip in it containing information on the individual. It is also contemplated that a plastic smart card could be used with a magnetic strip without a chip.

The invention advantageously reduces fraud on social service companies and the government by providing a safe method of pre-authorizing users and guaranteeing payment from single or multiple sources.

The steps of this method include first obtaining social service for an individual.

Next, a smart card is created for the individual. For the chip version of the smart card, the card is first manufactured in a conventional manner, and then the relevant information is downloaded from the computers of the insurance company to the card. For a non-chip version of a smart card, the card manufacturer would be provided information about the individual from the insurance company and embed the relevant information in the magnetic strip and then mail or transfer the magnetic strip card to the user.

The individual can be the primary individual, a spouse, a non-married "significant partner", at least one dependent, such as one or more children, or it can be combinations of these.

It is also contemplated to be within the scope of the invention that the primary individual can be an animal, such as a thoroughbred horse, like Secretariat the winning race horse, a famous breeding bull or some other type of registered pure-bred animal, such as an American Kennel Club (AKC) registered animal. The primary individual, if an animal can be linked with an appropriate animal insurance policy, such as those available through the AKC.

The smart card can contain information about social service and an individual identification code, such as an individual identification number or "PIN".

The smart card is an electronically readable card and can connect to the service provider of the insurance contract, and may be via the Internet or telephone line. The card is contemplated to preferably contain information on at least one or more of the following:

a. individual name (example—Richard Wood);
b. individual address (example—2396 Wood Street, Houston, Tex. 77019);
c. individual phone number (example—713-323-5555);
d. individual fax number (example—713-323-5554);
e. individual email address (example—Wood@aol.com);
f. government name or plan manager name (example—a privately funded plan such as Klein Independent School District Employee Benefit Plan of Texas);
g. government address or plan manager's address (example—the address for the Klein Plan PO Box 672528, Houston, Tex. 77267);
h. government phone number or plan manager's phone number (example—281-873-8682);
i. optionally, the government fax or plan manager's fax number;
j. optionally, government e-mail or plan manager's email address;
k. government's website or plan manager's website (example—www.hasonline.com);
l. government claims representative or plan manager's representative (example—Health Administration Services, Inc.);
m. type of plan (example—PPO);
n. individual policy number or plan number (example—Group 200116289.);
o. individual group number or group plan number (example—KLINASD);
p. individual's co-pay amount (example—$25);
q. individual deductible amount (example—$500 deductible);
r. individual's social service history;
s. instructions (example—pre-certification instructions or urgent admission instructions or emergency admission instructions can be embedded in the card);
t. other phone numbers (example—a phone number for prescription information, a phone number to locate qualified pharmacies under the plan, a phone number to call an approved pharmacist, a phone number to talk to a government's nurse, a phone number for mental health questions, and/or a phone number for chemical dependency);
u. issue date or "validity" date;
v. an expiration date or "expiry date";
w. statements as to ownership of the card;
x. statements as to eligibility of the holder as to the rights of the card and the existence of written agreements related to the card; and
y. disclaimers concerning use, misuse and revocation of the card.

The smart card can also contain information on funds which are available from the government for a completed authorized social service for a particular patient. For example, the card can contain information on the "accelerated fund payment schedule" or the typical payment schedule for a particular social service if the two differ. Generally, the phrase "completed authorized social service" is considered to be a service that has been authorized by contract by the government or is a stated item of coverage.

The accelerated fund payment schedule could be a 100% payment schedule or a partial accelerated fund payment schedule depending on the contract with the government. It is contemplated that the funds would move electronically from the government's bank account to the service provider's bank account, such as by wire transfer, or similar normal electronic banking procedures.

Additionally, the smart card can contain information about the various insurance coverages held by the individual. An individual can have insurance that could cover the costs of the social service.

In the method, the smart card is used to determine if the individual is eligible for accelerated provision of funds from the government to a service provider for social services based on coverage.

Additionally, the smart card can be used to determine if a social service is preauthorized by the government for the individual, such as for a "John Doe", who is preauthorized for welfare without need for additional authorization from the government.

The smart card is used to not only contain the information described above, but to link to the government's database and between the government's database and the service provider's database and the service provider's bank account. The smart card facilitates a first transmission from the service provider to the government. This first transmission can include information on:

i. determination that the card is valid and the individual is eligible;
ii. determination that the service provider is authorized to provide the service;
iii. proposed social service costs;
iv. information on the social services; and
v. an acknowledgement that at least one social service has been rendered from the service provider to the individual.

The smart card facilitates the receipt of a second transmission from the government to the service provider. This second transmission can contain information on the amount of payment required by the individual based on the insurance coverage. The amount of payment can be all or part of a co-payment fee, all or part of a deductible fee and combinations of these fees.

The smart card facilitates a third transmission to the government from the service provider. This third transmission would include an acknowledgement that the amount of the co-payment and the deductible has been paid by the individual to the service provider thereby initiating payment by the government.

It should be noted that in the context of this invention, the government is considered an entity that has been authorized by the federal government or a state board of insurance to deliver insurance benefits for social service.

Additionally, the government, as a set in the process, must make contracts with various service providers, such as pharmacists, nurses, doctors, and nursing homes that can be linked to the smart card.

The method involves that on approximately the same day that the third transmission is received by the government, or perhaps on or a few days later, funds are then transmitted from the government to the service provider for the social service provided to the individual. This accelerated payment plan is a vast improvement over known systems that take up to eight months to pay a service provider.

This method contemplates that the social service can be service related to social examinations, social tests, social diagnosis, combinations of these and other procedures that have not been named.

This method contemplates that the smart card can be used to determine if a second opinion is required by the government for a social service.

Figure 1:
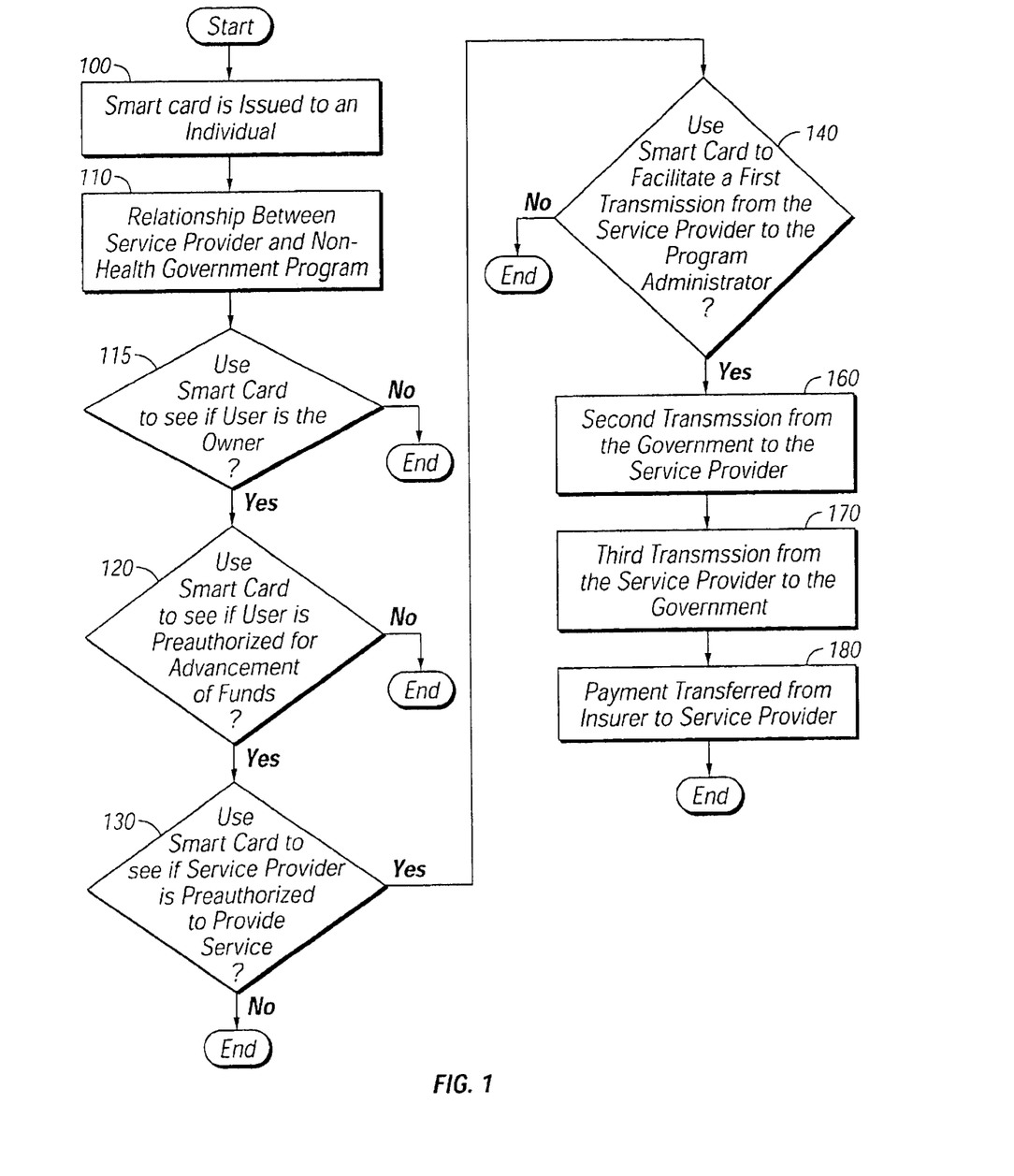
FIG. 1 is a diagrammatic representation of the overall method of the invention.

Now and with reference to the Figures, FIG. 1 shows a diagram of the overall invention.

First, a smart card is issued to an individual (100). The smart card is related to a particular non-health government social service program having an individual identification code for the individual. A relationship is created between the providers of services and products under the particular non-health government social service program (110). The providers of the service will be paid directly by the government.

The smart card is used to determine if the individual is the owner of the card (115) and is preauthorized for the advancement of funds (120) for a particular non-health government social service program. The smart card is next used to establish if a service provider is preauthorized to provide a product or service under the particular non-health government social service program (130).

The smart card is used using the smart card to facilitate a first transmission from the service provider to the program administrator (140).

Figure 2:
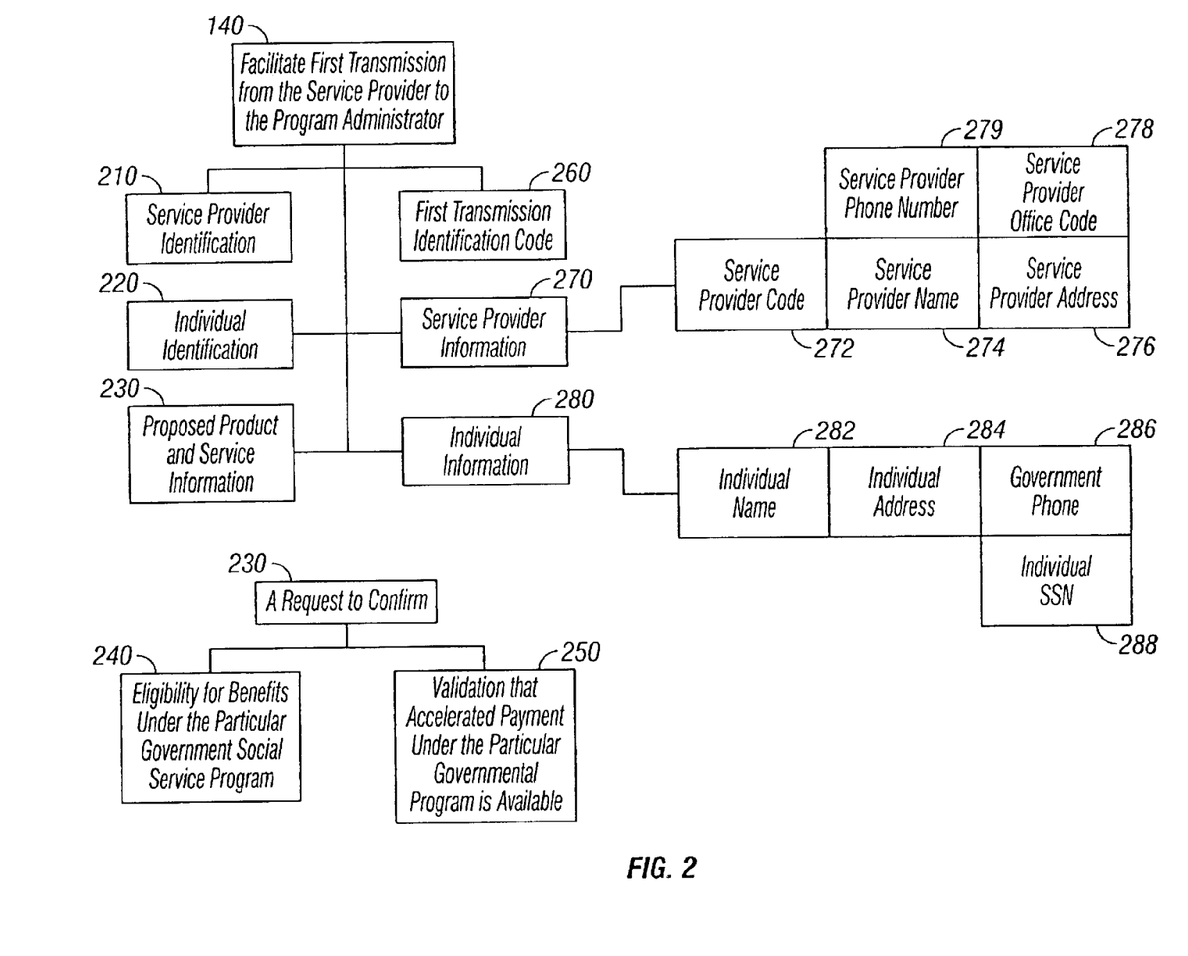
FIG. 2 is a diagrammatic representation of the first transmission.

As shown in FIG. 2, the first transmission includes service provider identification (210), individual identification (220), proposed product and service information (230), and a request to confirm (230). The confirmation involves the individual's eligibility for benefits under the particular non-health government social service program (240) and validation that accelerated payment of funds under the particular governmental program is available (250).

The first transmission (140) can further include a first transmission identification code (260); service provider information (270); and individual information (280). Examples of service provider information (270) are service provider code (272), service provider name (274), service provider address (276), service provider office code (278), and service provider phone number (279). Examples of individual information (280) are individual name (282), individual address (284), government phone (286), and individual social security number (288), and combinations thereof.

Referring back to FIG. 1, the smart card is used to facilitate a second transmission from the government to the service provider (160).

Figure 3:
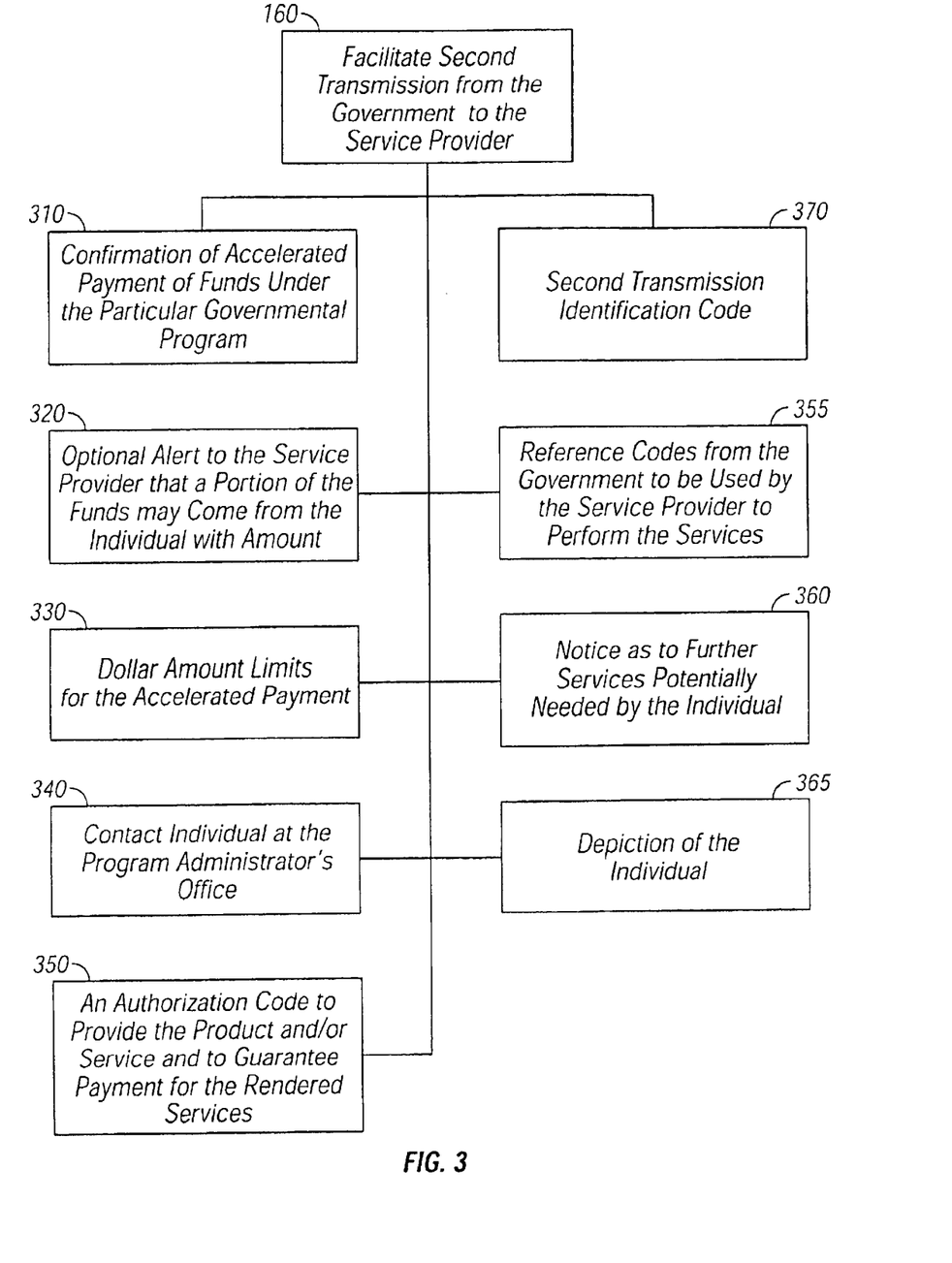
FIG. 3 is a diagrammatic representation of the second transmission.

As shown in FIG. 3, the second transmission (160) includes confirmation of accelerated payment of funds under the particular governmental program (310); an optional alert to the service provider that a portion of the funds may need to come from the individual and an indication of that fund amount (320); dollar amount limits for the accelerated payment (330); contact individual at the program administrator's office (340); and an authorization code to provide the product and/or service and to guarantee payment for the rendered services (350).

The second transmission (160) can also include reference codes from the government to be used by the service provider to perform the services (355); a notice as to further services potentially needed by the individual (360); a depiction of the individual (365); a second transmission identification code (370), and combinations thereof.

Referring back to FIG. 1, the smart card, next, is used to facilitate a third transmission from the service provider to the government (180).

Figure 4:
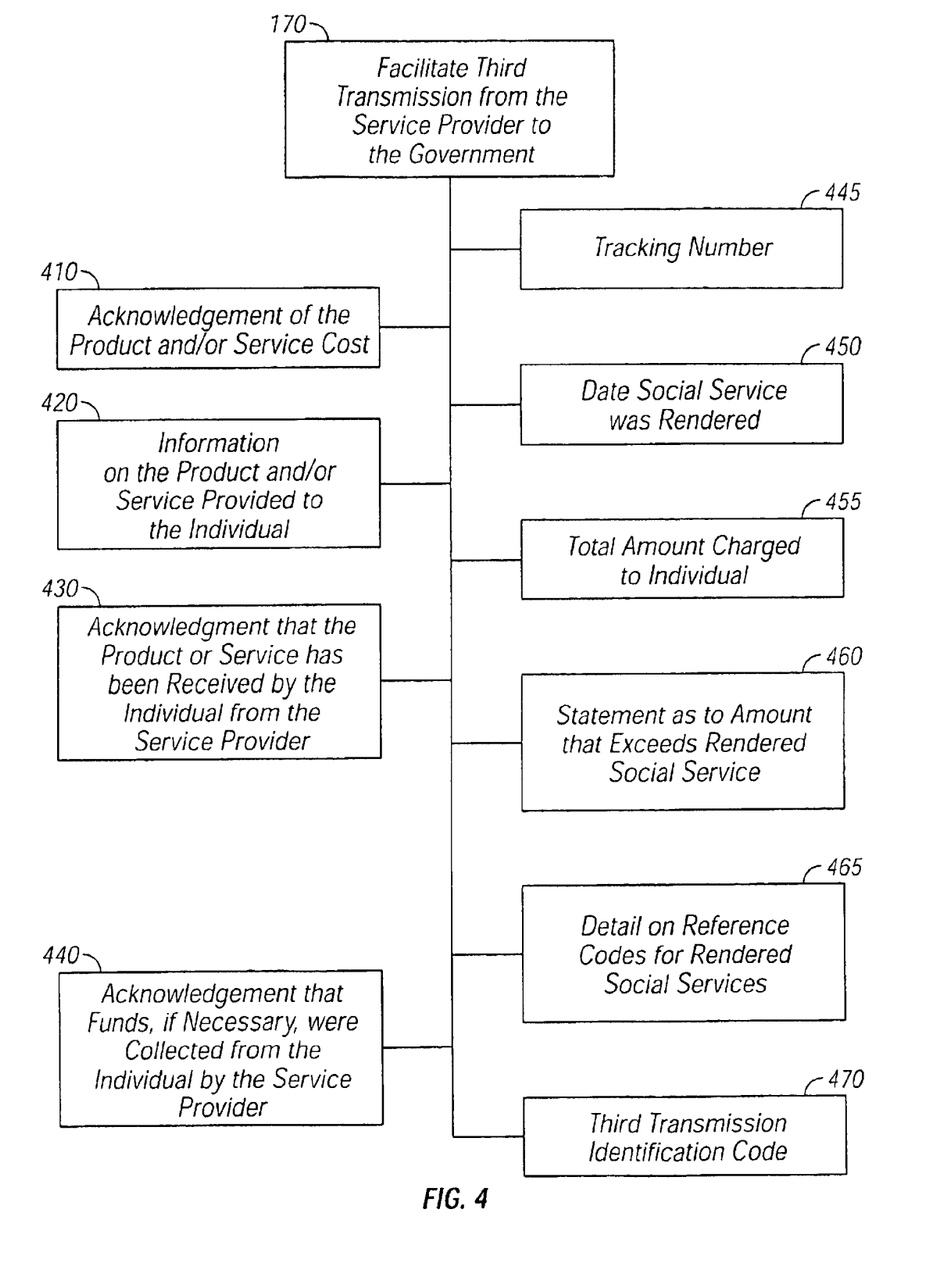
FIG. 4 is a diagrammatic representation of the third transmission.

The third transmission (170), shown in FIG. 4, involves an acknowledgement of the product and/or service cost (410); information on the product and/or service provided to the individual (420); acknowledgement that the product or service has been received by the individual from the service provider (430); and acknowledgement that funds if necessary, were collected from the individual by the service provider (440).

On approximately the same day that the third transmission is received by the government, funds are transmitted from the government to the service provider (180) for the product and/or service provided to the individual.

The third transmission (170) can also involve a tracking number (445); date social service was rendered (450); total amount charged to individual (455); statement as to amount that exceeds rendered social service (460); detail on reference codes for rendered social services (465); a third transmission identification code (470); and combinations thereof.

Figure 5:
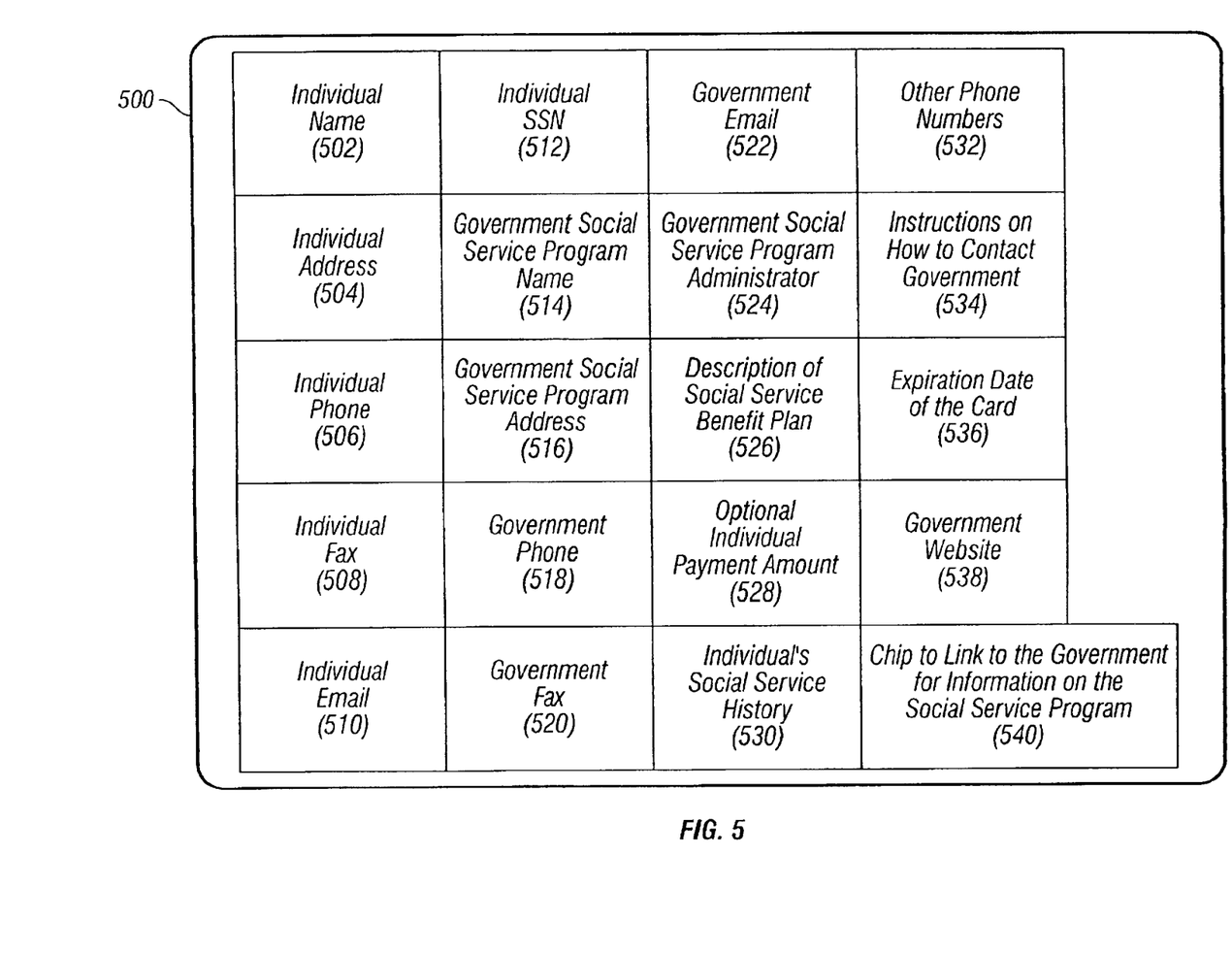
FIG. 5 is a diagrammatic representation of a smart card usable in the invention.

FIG. 5 shows a smart card that is contemplated as within the scope of the invention. The smart card is an electronically readable card containing individual name (502); individual address (504); individual phone number (506); individual fax number (508); individual email address (510); individual social security number (512); government social service program name (514); government social service program address (516); government phone number (518); government fax number (520); government e-mail address (522); government social service program administrator (524); description of social service benefit plan (526); optional individual payment amount (528); individual's social service history (530) (this information can include information on length of time on government programs and types of other programs the individual is a participant); other phone numbers (532); instructions on how to contact government (534); expiration date of the card (536); government website (538); a chip to link to the government for information on the social service program (540); and combinations thereof. Examples of each information type are located earlier in this description.

In alternative embodiments, the method can include the step of creating a contractual relationship between the government and a third party for the benefit of the individual. The method can also include the step of disposing marks on the card. Examples of marks on the card are the government, third parties, service providers and combinations thereof.

The funds can be for a completed authorized social service. A completed authorized social service is a service that has been authorized by contract by the government or is a stated item of coverage in a government social service plan.

Figure 6:
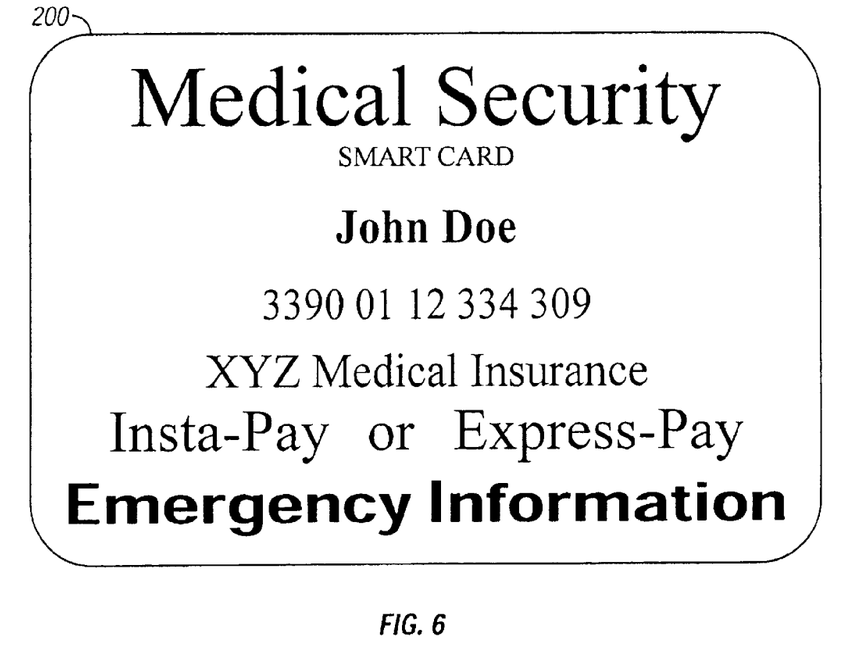
FIG. 6 is a picture of a smart card.

FIG. 6 shows an example of a smart card (500).

The method described herein is its preferred embodiment is a direct transaction between the service provider and the government using the smart card to facilitate the transaction. In an alternative embodiment, the smart card is contemplated to provide aid to third parties intermediaries.

These third party intermediaries act as a go between the government programs and the individuals receiving the benefit from a government program. Examples of third party intermediaries are School for Meal programs, job placement assistance programs, organizations like Meals On Wheels, and other similar programs.

The smart card would facilitate access to the funds the government gives to the third party intermediaries. The funds in the third party intermediaries' account would be transferred directly to the service provider once government approved services had been rendered.

The smart card would also enable the third party intermediaries to report in a more expedited manner without additional labor. The government presently requires regular reports, both on an individual basis and in aggregate, in order for the third party intermediaries to receive funds. Using the smart card eliminates the need for the third party intermediaries to create the reports because the smart card tracks and reports automatically.

While this invention has been described with emphasis on the preferred embodiments, it should be understood that within the scope of the appended claims the invention might be practiced other than as specifically described herein.

What is claimed is:

1. A method for accelerating the provision of funds to an individual from a non-health government social service program via a program administrator using a smart card, consisting of the steps of:
   a. issuing a smart card to an individual related to a particular non-health government social service program having a individual identification code for the individual;
   b. creating a relationship with providers of services and products under the particular non-health government social service program to be paid directly by the government for services and products using the smart card;
   c. using the smart card with a chip to determine if the individual:
      i. is the owner of the card;
      ii. is preauthorized for the advancement of funds for a particular non-health government social service program;
   d. using the smart card to determine if a service provider is preauthorized to provide a product or service under the non-health particular government social service program; and
   e. using the smart card to facilitate a first transmission from the service provider to the program administrator, wherein the first transmission comprises:
      i. service provider identification;
      ii. individual identification;
      iii. proposed product and service information,
      iv. a request to confirm:
         1. the individual's eligibility for benefits under the particular non-health government social service program; and
         2. to validate that accelerated payment of funds under the particular non-health governmental program is available;
   f. using the smart card to facilitate a second transmission from the government to the service provider, wherein the second transmission comprises:
      i. confirmation of accelerated payment of funds under the particular non-health governmental program;
      ii. an alert to the service provider that a portion of the funds may need to come from the individual and an indication of that fund amount;
      iii. dollar amount limits for the accelerated payment;
      iv. contact individual at the program administrator's office;
      v. authorization code to provide the product and/or service and to guarantee payment for the rendered services;
   g. using the smart card to facilitate a third transmission from the service provider to the government, wherein the third transmission comprises:
      i. an acknowledgement of the product and/or service cost;
      ii. information on the product and/or service provided to the individual;
      iii. acknowledgement that the product or service has been received by the individual from the service provider; and
      iv. acknowledgement that funds if necessary, were collected from the individual by the service provider; and
   h. from zero to two days from the third transmission being received by the government, funds are transmitted from the government to the service provider and received by the service provider for the product and/or service provided to the individual.

2. The method of claim 1, wherein the first transmission further comprises:
   a. a first transmission identification code;
   b. service provider information that comprises a member of the group:
      i. service provider code;
      ii. service provider name;
      iii. service provider address;
      iv. service provider office code; and
      v. service provider phone number;
   c. individual information that comprises a member of the group:
      i. individual name;
      ii. individual address;
      iii. government phone number;
      iv. individual social security number; and
      v. combinations thereof.

3. The method of claim 1, wherein the second transmission further comprises;
   a. reference codes from the government to be used by the service provider to perform the services;
   b. a notice as to further services potentially needed by the individual;
   c. a depiction of the individual; and
   d. a second transmission identification code.

4. The method of claim 1, wherein the third transmission comprises:
   a. a tracking number;
   b. date social service was rendered;
   c. total amount charged to individual;
   d. statement as to amount that exceeds rendered social service;
   e. detail on reference codes for rendered social services; and
   f. a third transmission identification code.

5. The method of claim 1, wherein the smart card is an electronically readable card comprising information selected from the group:
   a. individual name;
   b. individual address;
   c. individual phone number;
   d. individual fax number;
   e. individual email address;
   f. individual social security number;
   g. government social service program name;

h. government social service program address;
i. government phone number;
j. government fax number;
k. government e-mail address;
l. government social service program administrator;
m. description of social service benefit plan;
n. optional individual payment amount;
o. individual's social service history;
p. other phone numbers;
q. instructions on how to contact government;
r. expiration date of the card;
s. government website;
t. a chip to link to the government for information on the social service program; and
u. combinations thereof.

6. The method of claim 5, wherein the individual's social service history includes information on length of time on government programs and types of other programs the individual is on.

7. The method of claim 1, further comprising the step of creating a contractual relationship between the government and a third party for the benefit of the individual.

8. The method of claim 1, further comprising the step of disposing marks on the card selected from the group: the government, third parties, service providers and combinations thereof.

9. The method of claim 1, wherein the funds are for a completed authorized social service.

10. The method of claim 1, wherein a completed authorized social service is a service which has been authorized by contract by the government or is a stated item of coverage in a government social service plan.

* * * * *